June 4, 1963   J. RUBINSTEIN   3,091,978
SWIVELLED CRANKS
Filed Feb. 9, 1961
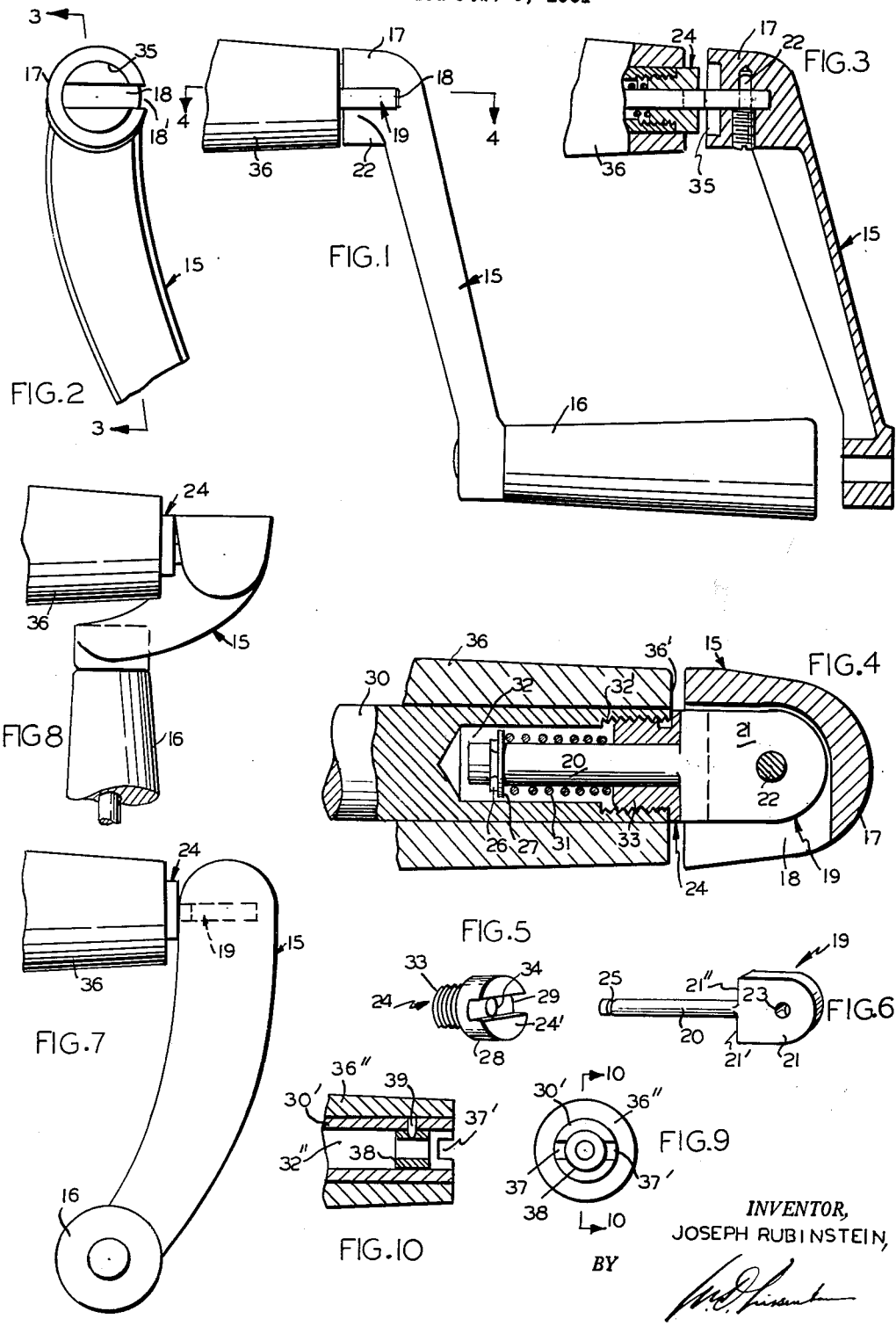
INVENTOR,
JOSEPH RUBINSTEIN,
BY
ATTORNEY 3,091,978
SWIVELLED CRANKS
Joseph Rubinstein, Newburgh, N.Y., assignor to General Slicing Machine Co., Inc., Walden, N.Y., a corporation of New York
Filed Feb. 9, 1961, Ser. No. 88,204
7 Claims. (Cl. 74—547)

The present invention relates to a crank having a handle, of the type used on hand-operated appliances.

An object of this invention is to provide a novel and improved crank which is in swivelled relation to the shaft it drives but held in proper operating position by a clutch means, manipulatable to allow a required shifting of handle direction so that when not in use, the handle is not a lateral extension away from the appliance, but when in fold-away position, is out of the way and total overall size is decreased, which serves to advantage in the packaging and storage of the appliance.

A further object thereof is to provide a novel and improved construction in fold-away cranks of the character mentioned, affording unique means to position the crank in operative condition and to afford its release and a swivel shift to bring it to fold-away position.

Another object thereof is to provide a fold-away crank of the nature set forth and having the mentioned attributes, which is simple in construction, reasonably cheap to manufacture, easy to manipulate and efficient in carrying out the purposes for which it is designed.

Other objects and advantages will become apparent as this disclosure proceeds.

For the practice of this invention, one form it may assume is to have a crank with a forwardly extending handle at one end and a rearwardly extending boss at the other end thereof. Said boss is formed with a channel in its rear face. The head of an eye-bolt form is movably fitted in the channel on an axis pin through the boss about which pin it may rotate. The shank of the eyebolt form extends into the hollow end of a shaft so provided. The end of such shaft which is the one to be driven by the crank, presents a channel formation to serve as one part of a clutch. Shoulders on the eyebolt form fit into said channel to constitute the complementary co-operating clutch part. There is a bushing fixed in the shaft's hollow to serve as a slide bushing for said shank. Spring means within said hollow bias the clutch parts to engage. When the crank is pulled to stress the spring, the clutch will assume open condition whereupon the crank may be swivelled to a swing-away position where the axis of the handle is in a direction which is perpendicular to the axis of the driven shaft.

The channel formation at shaft end may be offered by the attached part which also serves as the mentioned slide bushing or it may be provided by notches across the shaft's end in which event the slide bushing is a part secured within the shaft hollow.

Other incidents of structure will be set forth herein, so now I will give a detailed description of various embodiments of this invention and their manner of operation.

In the accompanying drawing forming part of this specification, similar characters of reference indicate corresponding parts in all the views.

FIG. 1 shows a side view of a crank embodying the teachings of this invention. Here the crank is in operative position, associated with the shaft it is to drive.

FIG. 2 is a fragmentary rear view of the crank.

FIG. 3 is a section taken at line 3—3 in FIG. 2, showing the crank pulled forward to open the clutch means. Now the crank is ready to be swivelled to swing-away position.

FIG. 4 is an enlarged section taken at line 4—4 in FIG. 1.

FIG. 5 is a perspective view showing the clutch component which is carried at the end of the shaft in this embodiment.

FIG. 6 is a perspective view showing the complementary clutch component which is carried by the crank.

FIG. 7 is like FIG. 1, except that here the crank is shown in swing-away position.

FIG. 8 is a top plan view of FIG. 7.

FIG. 9 shows the end face of a journalled shaft formed to serve as a clutch component for co-operation with the one on said crank. This is a modified construction.

FIG. 10 is a section taken at line 10—10 in FIG. 9.

In the drawing, the numeral 15 designates generally a crank having a forwardly extending handle 16 at one end and a rearwardly extending hub 17 at the other end. A channel 18 across the rear face of the hub is open at one end and closed at the other; the open end 18' being through a side of said hub. A plunger member of eyebolt form, indicated generally as 19, comprises an elongated shank 20 presenting diametrically opposite shoulders 21', 21" which may be offered by an integral enlarged end tab 21 on said shank. This tab is positioned within said channel 18, preferably in slide fit with the opposite inner channel walls and is pivoted to the crank by the axis pin 22 which is perpendicular to the axis of the shank 20; said pin 22 fitting through the hole 23 in said tab 21.

The shank 20 carries a bushing denoted generally by the numeral 24, having as one of its purposes to serve as a slide bearing for said shank. Near the free end of said shank 20 there is an annular groove 25 for a retainer ring 26 to serve as a stop for a washer 27 on said shank. There is a compression coil spring 31 about said shank, bearing against said bushing and the washer 27. It is intended that said shoulders 21', 21" co-operate with the channel or slotted formation 29, to form a clutch structure at the end of the shaft 30 which is to be driven by the crank.

In the embodiment shown in FIGS. 1–3, the shaft end is provided with an axial bore 32 having a threaded counter-bore 32'. The threaded reduced end 33 of the clutch part 24 is tightly engaged in the thread of 32' and the round head or flange 28 is at the front of shaft end. The bore 34 makes the item 24 serve as a slide bearing for the shank 20 which extends therethrough into the bore 32. It is advisable to have the counterbore 35 in the rear face of the crank's hub 17 to position the crank 15 and serve as a bearing when the crank is in operative position. Without further illustration, it is readily understandable that if the front face 24' of the item 24 is made flush with the front face 36' of the bearing 36, that said counter-bore 35 is omitted; said bearing 36 being part of the appliance or mechanism presenting the shaft 30 which is to be driven.

In the modified form shown in FIGS. 9 and 10, the item 24 is omitted, and in place thereof, the channel structure to receive the shoulders 21', 21" of the tab 21, is furnished by the notches 37, 37' in the end of the shaft 30'. Here, a slide bearing for the shank 20 is provided by the bushing 38 which is pinned at 39 to fix said bushing in the shaft's bore 32" a bit away from the notches 37, 37'. Here, the shaft end is shown flush with the front face of the appliance's bearing 36" and so the counter-bore 35 is omitted in the crank 15. Without further illustration, it is readily understandable that the shaft 30' may extend from the bearing 36" so that the notches 37, 37' be outside as is the channel 29 in the embodiment illustrated in FIGS. 1–3. In such instance the counter-bore 35 is included in the crank structure 15 to receive the shaft end when the crank is set in operating position.

In FIG. 1 which shows the crank 15 in operative position, where of course, the axis of the handle 16 is parallel to the axis of the shaft 30, the tab 21 is engaged in the channel 29 in the clutch part 24 whose head 28 is within the counterbore 35. The constantly stressed spring 31 maintains such arrangement.

To bring the crank 15 to swing away position shown in FIGS. 7 and 8, it is pulled forwardly by hand to a position where the clutch is open, that is where the tab 21 is out of the channel 29 and of course, the slotted head 24 will be out of the counterbore 35 as in FIG. 3. Now the crank is swivelled a quarter turn about the axis pin 22 and let go. The axis of the handle 16 is now in a direction which is perpendicular to the axis of the shaft 30. (It is evident that the manipulations for the modified embodiment shown in FIGS. 9 and 10 are similar to the above.)

It is to be noted that the channel 18 which is closed at one end, permits the quarter turn away from operating position in only one direction. If said channel be open clear through at both ends, the swivelling of the crank 15 about the axis 22, may be a quarter turn in either direction, as may be desirable in various installations.

This invention is capable of various forms and numerous applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description herein to indicate the scope of this invention.

I claim:

1. In combination with a revolvable shaft having a tubular end, a crank having a forwardly extending handle at one end and a rearwardly extending boss at its other end, said boss provided with a channel in a direction across its rear face, at least one end of said channel being open through a side of said boss, a shank extending from within said channel into the tubular end of said shaft, said boss being pivotally secured to said shank about an axis substantially perpendicular to the direction of the length of said shank and capable of only rotary movement about said pivotal axis, a channel formation across said end of the shaft, a bearing element secured in said shaft end, said shank being through said bearing element, slidable lengthwise therein and extending beyond said bearing further into said tubular shaft end, spring means within said tubular end biasing said shank into said tubular shaft end, said shank having lateral shoulder formation extending into and engaged by said channel formation whereby the crank is held against pivotal movement in relation to said shank and upon manually pulling the crank to move the shank in a direction outwardly of said tubular shaft end, said shoulder formation will leave its cooperating channel formation whereupon the crank is capable of swivelling about said pivotal axis.

2. The combination as defined in claim 1, wherein the shank end portion which is within the channel in the boss is an enlarged tab which presents said shoulder formation.

3. The combination as defined in claim 1, wherein the channel formation to engage the shoulder formation is provided by having the tubular shaft end provided with notch formation.

4. The combination as defined in claim 1, wherein the spring means is a tensed compression coil spring about the shank, bearing at one end against a stop element on the shank and bearing at its other end against the bearing element through which said shank is slidable.

5. The combination as defined in claim 1, wherein said channel formation for engaging said shoulder formation is in the end of the bearing element which faces the boss.

6. The combination as defined in claim 5, wherein the bearing element is an exteriorly threaded part having an enlarged head contiguous therewith; said head having the channel formation thereacross; the hole in said threaded part being communicative with said channel formation across said head and has the mentioned shank slidably fitted therethrough; the tubular end of the shaft being interiorly threaded and in engagement with said exteriorly threaded part, said head being against the very end of said shaft.

7. The combination as defined in claim 6, wherein the rear end of the boss is provided with a counterbore therein in which said head of the bearing element is positioned when the shoulder formation is engaged in the channel formation across said head.

References Cited in the file of this patent

UNITED STATES PATENTS

| | | |
|---|---|---|
| 503,747 | Latin | Aug. 22, 1893 |
| 1,851,307 | Hazelton | Mar. 29, 1932 |

FOREIGN PATENTS

| | | |
|---|---|---|
| 119,883 | Australia | Apr. 26, 1945 |
| 412,886 | Italy | Feb. 23, 1946 |
| 511,624 | Great Britain | Aug. 22, 1939 |